United States Patent
Kuehnle et al.

(10) Patent No.: US 9,437,055 B2
(45) Date of Patent: Sep. 6, 2016

(54) CABIN AND TRAILER BODY MOVEMENT DETERMINATION WITH CAMERA AT THE BACK OF THE CABIN

(71) Applicants: Andreas U Kuehnle, Villa Park, CA (US); Marton Gyori, Budapest (HU)

(72) Inventors: Andreas U Kuehnle, Villa Park, CA (US); Marton Gyori, Budapest (HU)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 0 days.

(21) Appl. No.: 14/458,290

(22) Filed: Aug. 13, 2014

(65) Prior Publication Data
US 2016/0049020 A1     Feb. 18, 2016

(51) Int. Cl.
G07C 5/08      (2006.01)
B60R 1/00      (2006.01)
G06T 7/00      (2006.01)

(52) U.S. Cl.
CPC ............. *G07C 5/0808* (2013.01); *B60R 1/002* (2013.01); *G06T 7/0046* (2013.01); *G07C 5/0816* (2013.01); *G07C 5/0841* (2013.01); *B60R 2300/105* (2013.01); *B60R 2300/80* (2013.01); *G06T 2207/30252* (2013.01)

(58) Field of Classification Search
CPC  G07C 5/0808; G07C 5/0816; G07C 5/0841; B60R 1/002; B60R 2300/80; B60R 2300/105
See application file for complete search history.

(56) References Cited

U.S. PATENT DOCUMENTS

| | | | |
|---|---|---|---|
| 6,923,080 B1 | 8/2005 | Dobler et al. | |
| 6,930,593 B2 | 8/2005 | Crawshaw | |
| 7,904,222 B2 | 3/2011 | Lee et al. | |
| 8,296,014 B2* | 10/2012 | Ghoneim | B60T 8/1755 340/440 |
| 8,311,693 B2* | 11/2012 | Wu | B60T 8/1708 180/14.1 |
| 8,326,504 B2* | 12/2012 | Wu | B60D 1/30 180/14.1 |
| 8,346,407 B2* | 1/2013 | Schneider | H04L 67/14 701/2 |
| 8,462,988 B2 | 6/2013 | Boon | |
| 8,571,777 B2* | 10/2013 | Greene | B60D 1/30 701/70 |
| 8,631,692 B2* | 1/2014 | Pfister | G01M 17/007 73/115.07 |
| 8,755,984 B2* | 6/2014 | Rupp | B62D 13/06 303/123 |
| 2008/0231701 A1 | 9/2008 | Greenwood et al. | |
| 2009/0093928 A1* | 4/2009 | Getman | B60T 8/1755 701/37 |
| 2010/0079590 A1 | 4/2010 | Kuehnle et al. | |
| 2010/0152951 A1* | 6/2010 | Chin | B60W 40/09 701/31.4 |
| 2010/0171828 A1 | 7/2010 | Ishii | |

(Continued)

FOREIGN PATENT DOCUMENTS

WO      2006/042665 A1     4/2006

OTHER PUBLICATIONS

Machine Translation WO2006042665, Chrysler, Apr. 2006.*

(Continued)

*Primary Examiner* — Rodney Butler
*Assistant Examiner* — Frederick Brushaber
(74) *Attorney, Agent, or Firm* — Fay Sharpe LLP (57) ABSTRACT

When calculating an angle of articulation between two portions of an articulated vehicle such as a tractor-trailer combination, a camera-based articulation angle measuring system comprises camera(s) mounted on the tractor and/or trailer that observe their counterpart and/or features on the other portion of the vehicle. The angles or locations of the counterpart features are measured in the image(s) produced by the camera(s). A geometric model is employed to convert the location and/or angular measurements into a corresponding articulation and/or roll angle for the tractor-trailer combination.

25 Claims, 10 Drawing Sheets

(56) References Cited

U.S. PATENT DOCUMENTS

| | | |
|---|---|---|
| 2011/0001825 A1 | 1/2011 | Hahn |
| 2012/0033078 A1 | 2/2012 | Huang |
| 2012/0182426 A1* | 7/2012 | Fukuda ................ G06T 7/0042 348/148 |
| 2012/0193889 A1* | 8/2012 | Harrison .................. B60T 7/20 280/423.1 |
| 2012/0308114 A1* | 12/2012 | Othmezouri ......... G05D 1/0253 382/154 |
| 2013/0236858 A1* | 9/2013 | Lin ..................... G09B 19/167 434/66 |
| 2014/0043473 A1 | 2/2014 | Gupta et al. |
| 2014/0078302 A1 | 3/2014 | Hamdan et al. |
| 2014/0085472 A1 | 3/2014 | Lu et al. |

OTHER PUBLICATIONS

International Search Report and Written Opinion of corresponding International Application No. PCT/US2015/040825, dated Oct. 13, 2015, 10 pages.

Caup et al., "Video-based Trailer Detection and Articulation Estimation," 2013 IEEE Intelligent Vehicles Symposium (IV), Jun. 23-26, 2013, Gold Coast, Australia, pp. 1179-1184.

* cited by examiner

CABIN AND TRAILER BODY MOVEMENT DETERMINATION WITH CAMERA AT THE BACK OF THE CABIN

BACKGROUND

The present application finds particular application in panoramic vehicle imaging systems. However, it will be appreciated that the described techniques may also find application in other vehicle monitoring systems, other imaging systems, or other vehicle safety systems.

Conventional approaches to determining articulation angle between a tractor and trailer use a plurality of sensors on the tractor to determine the articulation angle of the trailer. One such approach requires the hitch point to be visible to a camera mounted on the tractor, and trailer tongue length to be measured or known. Additionally, this approach does not use any view of the tractor itself to determine the articulation angle. Rather, a camera, mounted on the driver's outside mirror, must be able see the wheel. Moreover, in cars, the camera to wheel distance is relatively small. Such an approach is sensitive to weather (rain interferes with the view of the wheel), lighting (low sun, wet road, night . . . ), and is not suited to the larger distances found in tractor trailer arrangements, in which a wheel may be represented by only a few pixels. At such low resolution, angular measurement quality is detrimentally affected.

Another conventional approach employs a camera on the trailer for viewing behind the trailer, wherein the rearward-looking images are used in determining "optical flow" in relation to the movement of the trailer. Optical flow describes the way objects and/or points move, and is difficult to calculate reliably and cheaply. Moreover, this approach does not consider a camera facing the tractor and can only infer, indirectly and at great computational expense, an articulation angle.

The present innovation provides new and improved systems and methods that facilitate directly computing an articulation angle between first and second articulated portions of an articulating vehicle from camera images of the first or second portion of the vehicle, which overcome the above-referenced problems and others.

SUMMARY

In accordance with one aspect, a system that facilitates articulated vehicle articulation angle measurement comprises at least one camera coupled to a first portion of the articulated vehicle, wherein the camera monitors a second portion of the articulated vehicle, the second portion being articulably coupled to the first portion. The system further comprises a processor configured to measure at least one parameter of the second portion of the articulated vehicle in an image captured by the at least one camera. The processor is further configured to execute a geometric model that converts the at least one parameter measurement into a corresponding angular value between the first and second portions of the articulated vehicle.

In accordance with another aspect, a method of determining an articulation angle between a first portion and a second portion of an articulated vehicle comprises receiving at least one image from a camera coupled to the first portion of the articulated vehicle, wherein the camera monitors the second portion of the articulated vehicle, the second portion being articulably coupled to the first portion, and measuring at least one parameter of the second portion of the articulated vehicle in the at least one image. The method further comprises inputting the at least one parameter into a geometric model thereby converting the at least one parameter measurement into a corresponding angular value between the first and second portions of the articulated vehicle, and outputting the articulation angle to a user interface for display to a user.

In accordance with another aspect, a processor is configured to execute computer-executable instructions for measuring, the instructions comprising receiving at least one image from a camera couple to the first portion of the articulated vehicle, wherein the camera monitors the second portion of the articulated vehicle, the second portion being articulably coupled to the first portion, and measuring at least one parameter of the second portion of the articulated vehicle in the at least one image. The instructions further comprise inputting the at least one parameter into a geometric model thereby converting the at least one parameter measurement into a corresponding angular value between the first and second portions of the articulated vehicle.

In accordance with another aspect, an apparatus that facilitates articulated vehicle articulation angle measurement comprises means for capturing images, coupled to a first portion of the articulated vehicle, wherein the means for capturing images monitors a second portion of the articulated vehicle, the second portion being articulably coupled to the first portion, means for measuring an offset angle of the second portion of the articulated vehicle in an image captured by the means for capturing images, and means for converting the measured offset angle into an articulation angle between the first and second portions of the articulated vehicle.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which facilitate directly determining vehicle articulation angle from images of a forward or rear portion of an articulating vehicle (e.g., a tractor and trailer combination or the like).

In one embodiment, a camera is mounted on a first portion of the articulating vehicle (tractor back or trailer front) to look, at a relatively close distance, at a pattern or structure on the second portion of the articulating vehicle (trailer front or tractor back, respectively). The described camera arrangement is less sensitive to weather and road splash, while having a higher resolution, than conventional approaches. The information obtained by viewing the relationship between the tractor and trailer is employed to determine articulation angle directly. According to one example, the cameras that produce a surround view display of a vehicle can also be used to measure the tractor to trailer articulation angle, thus saving cost and simultaneously improving functionality.

Figure 1:
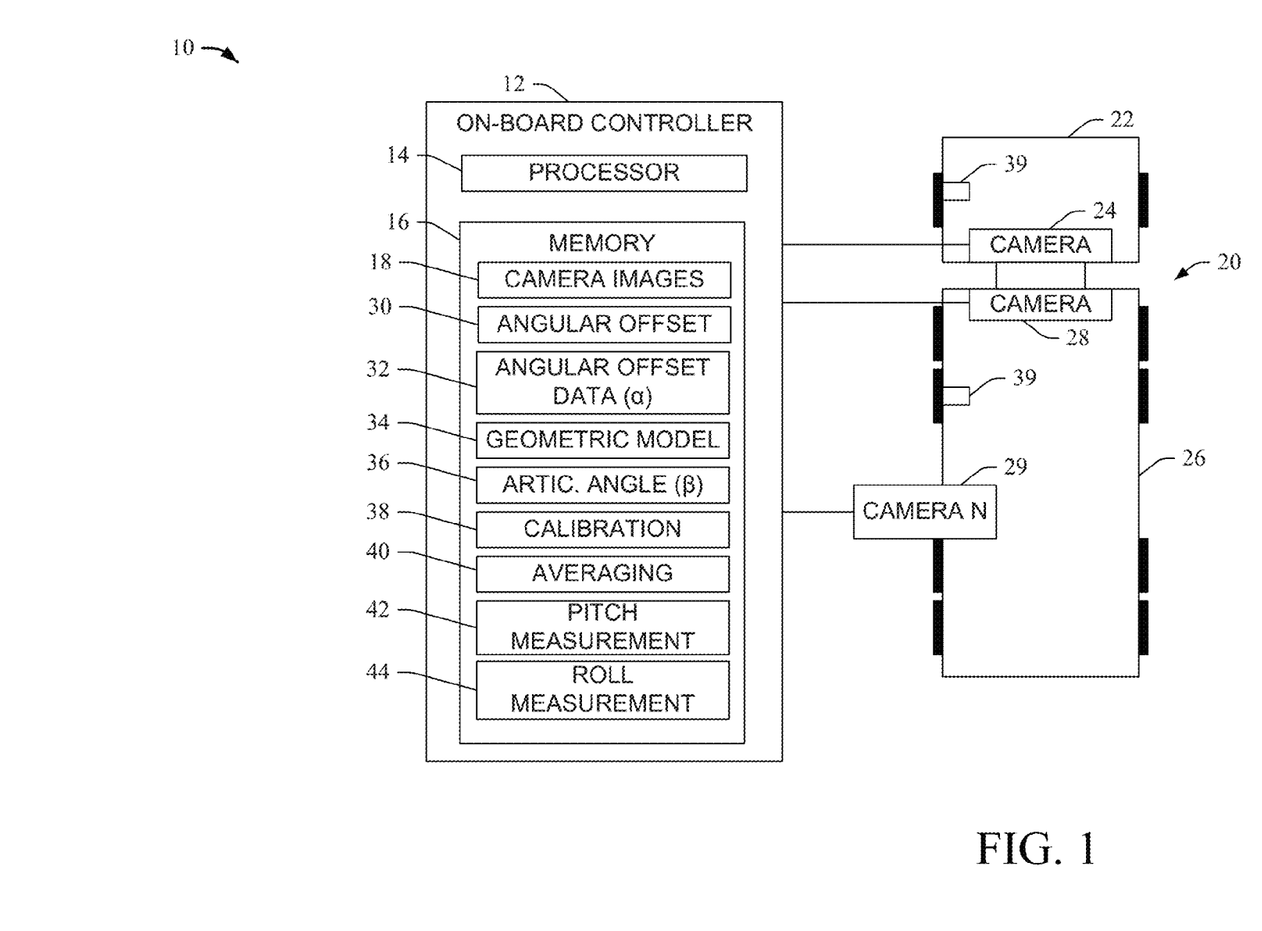
FIG. 1 illustrates a system that facilitates articulated vehicle articulation angle measurement, in accordance with various aspects described herein.

FIG. 1 illustrates a system 10 that facilitates articulated vehicle articulation angle measurement, in accordance with various aspects described herein. The system 10 includes an onboard controller 12 comprising a processor 14 that executes, and a memory 16 that stores, computer-executable instructions (e.g., modules, routines, programs, applications, etc.) for performing the various methods, techniques protocols, etc., described herein. In contrast to conventional approaches, the system 10 facilitates compensating for camera yaw and calculating a precise inter-camera distance in real time, which has the advantage of mitigating distance calculation error that can arise when sections of the articulating vehicle are interchanged.

The memory 16 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 14. Additionally, "module," as used herein denotes a set of computer-executable instructions (e.g., a routine, sub-routine, program, application, or the like) that is persistently stored on the computer-readable medium or memory for execution by the processor.

The memory 16 stores images 18 captured by one or more cameras coupled to an articulating vehicle 20. The one or more cameras monitor a gap between the forward portion (e.g., a tractor) and a rearward portion (e.g., a trailer) of the vehicle. For instance, a first portion 22 (e.g., a tractor) of the articulating vehicle 20 has mounted thereon a rearward facing camera 24 that captures images of a second portion 26 (e.g., a trailer) of the articulating vehicle 20. Additionally or alternatively, the second portion 26 of the articulating vehicle has mounted thereon a forward facing camera 28 that captured images of the first portion 22 of the articulating vehicle. Additional cameras 29 can be mounted to the vehicle 20 as part of a surround-view camera system that is employed to obtain images for calculation of the articulation angle of the vehicle 20. In one embodiment, the cameras are self-calibrating.

Although the examples described herein relate to calculating articulation angle using images of the second portion of the vehicle captured by the rearward-facing camera 24, it will be understood that the articulation angle can also be calculated in similar fashion using images of the first portion of the articulating vehicle captured by the forward-facing camera 28, and that the subject innovation is not limited to the rearward-facing camera embodiments. Moreover, an advantage of the described embodiments is that the camera, whether mounted on the back of the tractor or the front of the trailer, is in a shielded area that can be illuminated for improved visibility as well as protects the camera(s) from road splash and inclement weather that might otherwise impede the camera view. Additionally, when mounted to the back of the tractor, the camera can aid the driver in maneuvering the freestanding tractor.

According to one embodiment, the rearward facing camera 24 monitors the second portion 26 (e.g., the trailer) of the articulating vehicle, the second portion being coupled to the first portion 22 (e.g., the tractor) by an articulating coupling (e.g., a trailer hitch or the like). The processor 14 analyzes an image 18 of the trailer and executes angular offset module to measure at least one parameter (e.g., a degree of articulation, pitch, or roll) of the trailer of the articulated vehicle in an image captured by the rearward-facing camera 24 on the tractor. In one example, the processor 14 executes an angular offset module 30 that measures an angle $\alpha$ by which the image of the trailer is offset from horizontal. In another example, the processor identifies the position of the trailer in the analyzed image and compares it to an expected trailer position (e.g., when the trailer is straight behind the tractor) to determine articulation angle. Once the offset angle $\alpha$ is determined and the angular offset measurement data 32 is stored to memory, the processor executes a geometric model 34 (described in greater detail with regard to FIGS. 6-10) that converts the angular offset value $\alpha$ determined from the image into a corresponding actual angular value $\beta$ (i.e., the actual articulation angle) between the tractor and trailer. Actual articulation angle $\beta$ data 36 is stored to the memory for display to a driver on a user interface (not shown). According to a further embodiment, the processor executes a calibration module 38 that calibrates the articulation angle $\beta$ by executing a bias-removing averaging function over a plurality of images of the trailer.

Additionally or alternatively, an amount of roll (i.e., a roll angle) and/or pitch (i.e., pitch angle) experienced by the trailer during articulation is calculated. For instance, the system can comprise a plurality of sensors 39 (e.g., accelerometers or the like) coupled to the first and second portions of the articulated vehicle and in communication with each other. The processor executes a long term averaging function 40 to calculate a static pitch angle measurement difference 42 between at least one sensor on each of the first and second portions of the articulated vehicle. For instance, a distance between the sensors can be measured and subtracted from a known or averaged distance between the sensors to determine pitch angle there between. The processor dynamically measures pitch angle between the first and second portions of the articulated vehicle in this manner. To measure roll angle, the processor executes the long term averaging function to calculate a static roll angle measurement difference 44 between at least one sensor on each of the first and second portions of the articulated vehicle. The processor dynamically measures roll angle between the first and second portions of the articulated vehicle in this manner.

In one embodiment, the camera 24 mounted on the tractor observes the counterpart camera 28 on a trailer, or other features on the trailer. The angles or locations of the counterpart camera or features the trailer are measured by the processor 16 (e.g., by executing one or more modules described above) in the image(s) 18 produced by the camera(s). The preprogrammed geometric model 34 is executed by the processor to convert the location and/or angular offset measurements into a corresponding articulation and/or roll angle for the tractor-trailer combination. In addition, a bias removing, long term averaging function calibrates the calculated articulation angle. In another embodiment, accelerometers or similar sensors installed in the tractor and trailer are in communication with each other and contribute to the long term averaging function that learns the static pitch angle measurement difference between these sensors. Dynamic trailer to tractor pitch angle measurements are then calculated.

Additionally or alternatively, the camera 28 on the trailer is used to perform the articulation, pitch, and/or roll angle measurements. In this example, the forward facing camera 28 monitors a known or pre-generated pattern (e.g., a cross-hairs or the like) on the tractor back, the pattern being configured for measuring the articulation angle. In one embodiment, the pattern is formed from a plurality of LEDs to be clearly visible at night. The trailer camera also provides increased security by capturing images of the potential uncoupling of hoses/cables and unwanted motion between the tractor and trailer. In another embodiment, the cameras are in bi-directional communication with each other. A distance and angle of offset between the cameras is measured or calculated and used to refine a bird's eye view of the vehicle.

Figure 2:
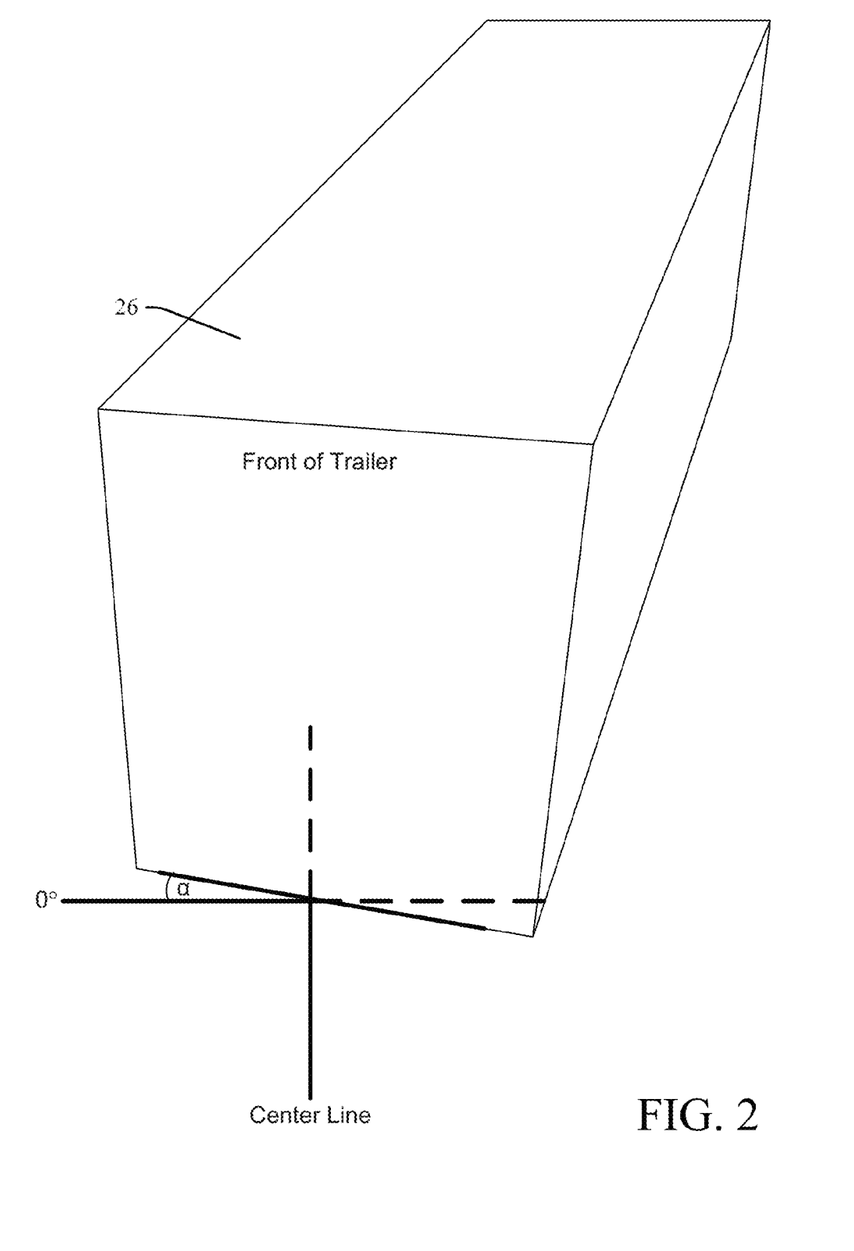
FIG. 2 illustrates a view of the trailer as seen from the camera, in accordance with one or more features described herein.

With continued reference to FIG. 1, FIG. 2 illustrates a view of the trailer 26 as seen from the camera 24 (FIG. 1), in accordance with one or more features described herein. The trailer 26 is shown in an articulated orientation, as indicated by the offset angle α. The offset angle is the angle as seen by the camera between horizontal (0°) and the bottom edge of the front of the trailer in this example. A centerline is also shown, which marks the vertical centerline of the trailer and facilitates determining the offset angle α.

In one embodiment, the angular offset module 30 computes average and time-varying locations of trackable features (e.g., the bottom edge of the trailer in this example) in the image. The average position, given appropriate speed constraints, corresponds to a condition in which the tractor and trailer are straight relative to each other and not articulated (i.e., the offset angle α is zero). The time-varying position is calibrated with a dynamic model and/or geometric model 34 of what is seen by the camera (e.g. the parallel edges of the trailer front top and bottom will have a varying slope in the image, related to the articulation angle). Steering angle may also considered with, for instance, a zero steering angle held over a sufficient time corresponding to a zero articulation angle.

Figure 3:
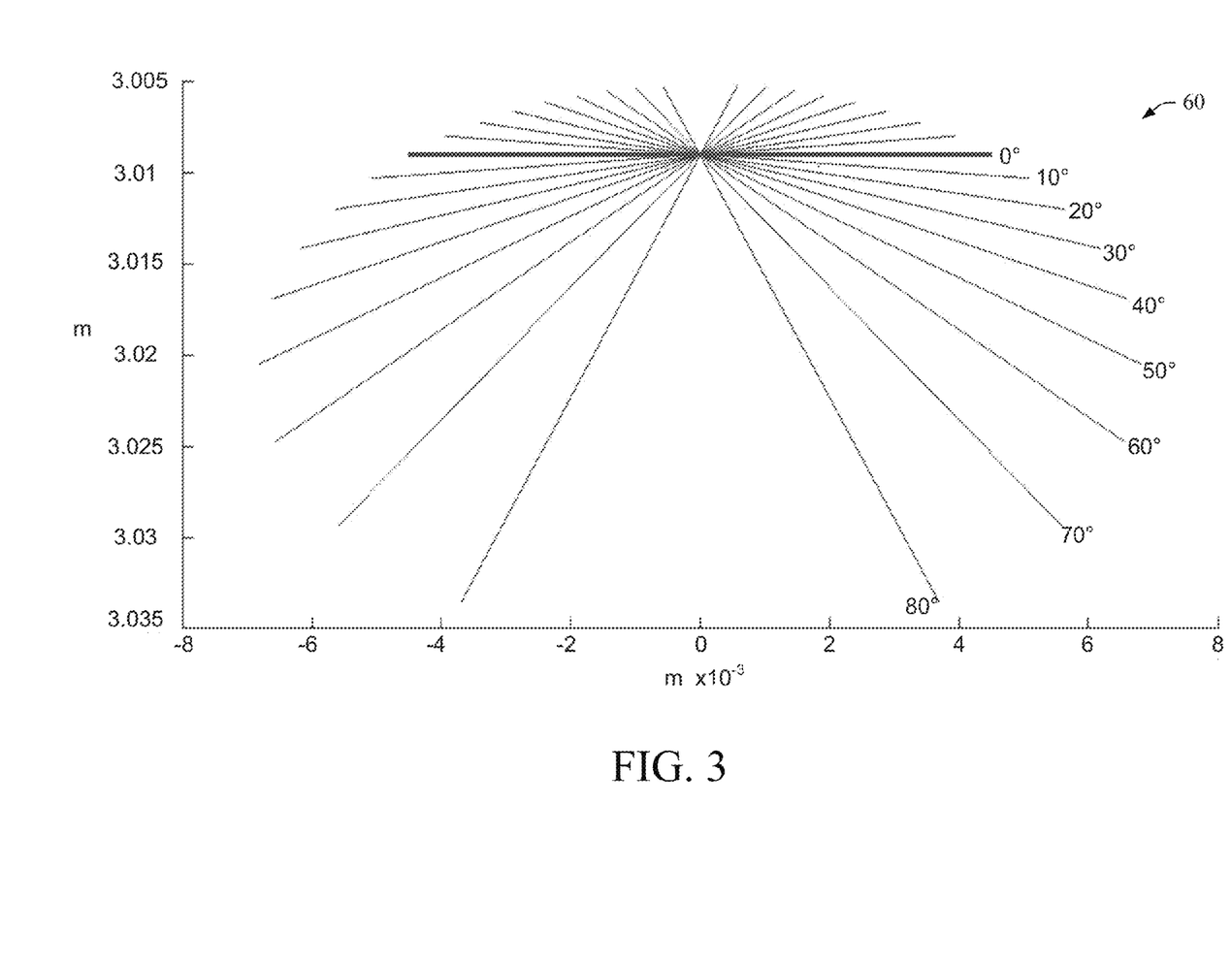
FIG. 3 illustrates a graph representing trailer top edge appearance, as seen by a rearward mounted camera on a tractor, with the trailer at different articulation angles.

FIG. 3 illustrates a graph 60 representing trailer top edge appearance, as seen by a rearward mounted camera on a tractor, as a function of articulation angle. It may be seen that both the length and angle of the top edge change with articulation angle. In one embodiment, when determining articulation angle between, e.g., a tractor and trailer, the processor (FIG. 1) identifies the trailer side edges and locates the ends of the edges (i.e., the top front corners of the trailer). Using a homographic matrix algorithm, the skewed lines of the trailer edges in the image are adjusted to form a bird's eye view of the trailer.

Figure 4:
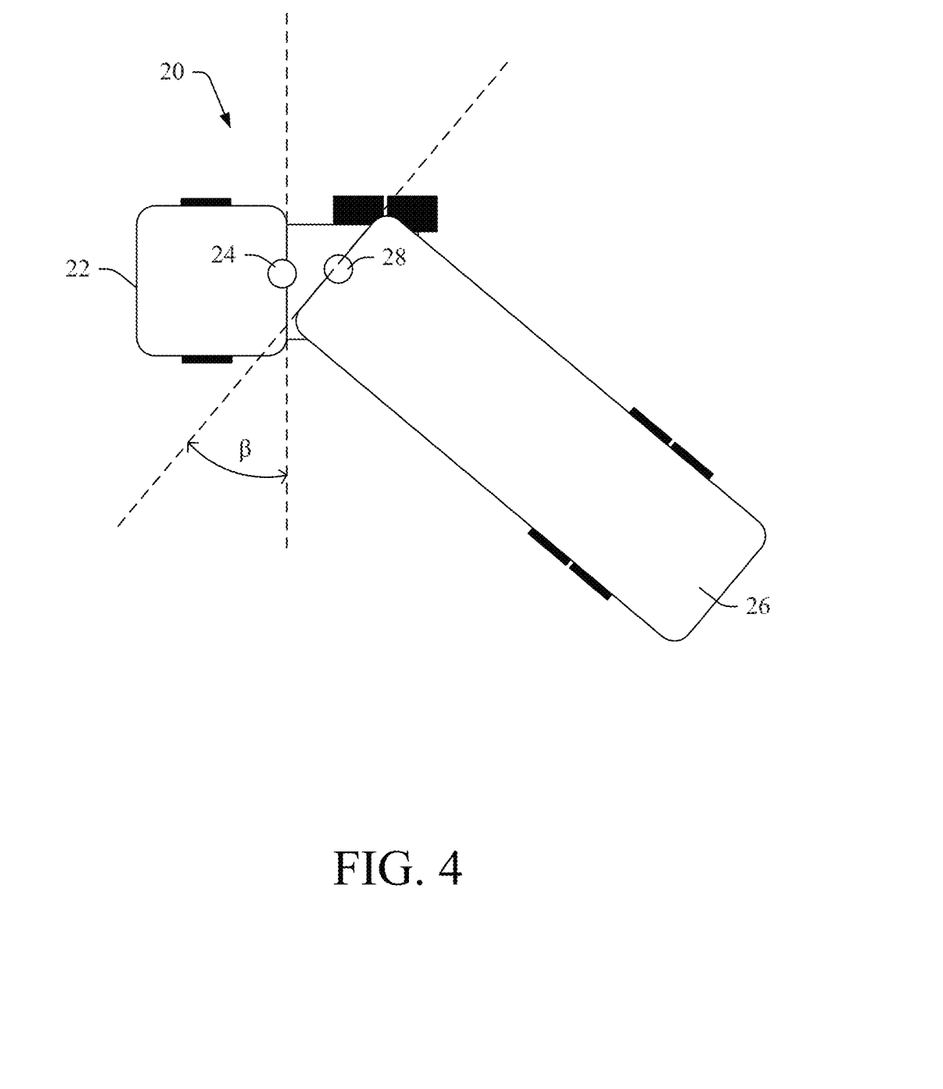
FIG. 4 illustrates the articulated vehicle, wherein the tractor and trailer are articulated relative to each other at an articulation angle $\beta$, in accordance with one or more aspects described herein.

FIG. 4 illustrates the articulated vehicle 20, wherein the tractor 22 and trailer 26 are articulated relative to each other at an articulation angle β, in accordance with one or more aspects described herein. Using images captured by one or both of the tractor-mounted camera 24 and the trailer-mounted camera 28, the processor 14 (FIG. 1) calculates the actual articulation angle β in real time based on the offset angle as determined in the captured image(s).

Figure 5:
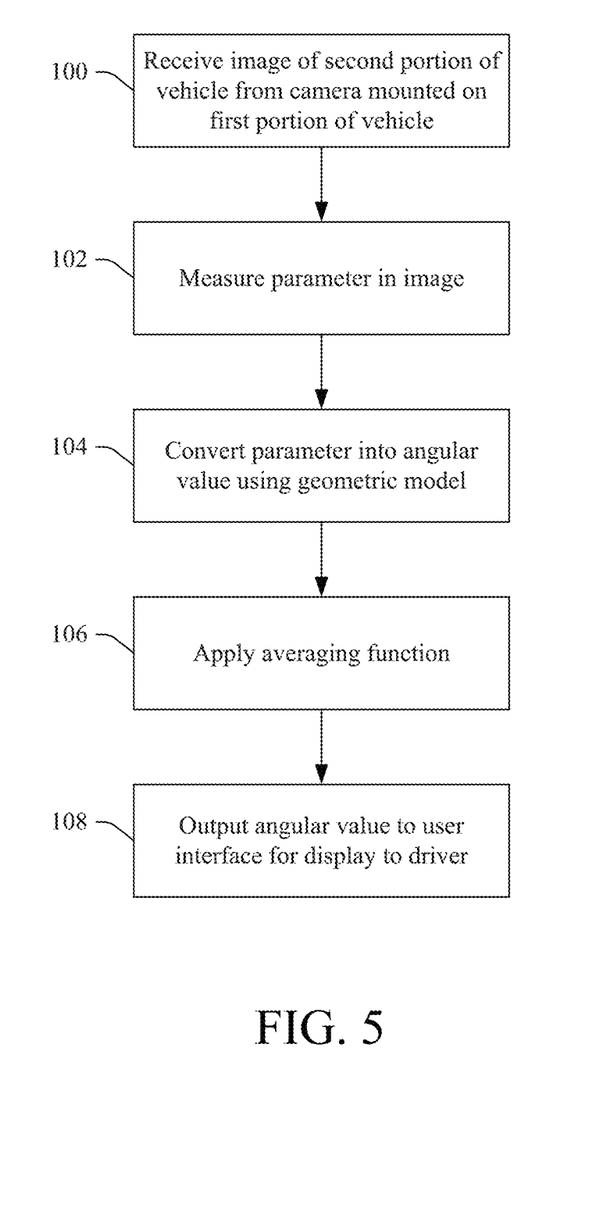
FIG. 5 illustrates a method for calculating in real time an articulation angle between portions of an articulated vehicle such as a tractor trailer combination or the like, in accordance with one or more features described herein.

FIG. 5 illustrates a method for calculating in real time an articulation angle between portions of an articulated vehicle such as a tractor trailer combination or the like, in accordance with one or more features described herein. At 100, at least one image from a camera coupled to a first portion of the articulated vehicle is received, wherein the camera monitors a second portion of the articulated vehicle that is coupled to the first portion by an articulating coupling (e.g., a trailer hitch or the like). At 102, at least one parameter of the second portion of the articulated vehicle in the at least one image is measured. The parameter may be, e.g., an angle by which the second portion of the articulated vehicle appears to be offset from horizontal in the at least one image. In another embodiment, the parameter is a position of the second portion of the articulated vehicle in the image. In yet another example, the parameter is a pattern printed or otherwise positioned on the surface of the second portion of the articulating vehicle. At 104, the at least one parameter is input to a geometric model that converts the at least one parameter measurement into a corresponding angular value between the first and second portions of the articulated vehicle.

At 106, an averaging function is applied over a plurality of images. For instance, the averaging function can be executed to calibrate the articulation angle. In another embodiment, the averaging function is a long term averaging function that facilitates calculating a static pitch angle measurement between at least one sensor (e.g., and accelerometer or the like) on each of the first and second portions of the articulating vehicle. The pitch angle between the first and second portions of the articulating vehicle is then dynamically measured. In a further embodiment, the averaging function is a long term averaging function that facilitates calculating a static roll angle measurement between at least one sensor (e.g., and accelerometer or the like) on each of the first and second portions of the articulating vehicle. The roll angle between the first and second portions of the articulating vehicle is then dynamically measured.

At 108, the angular value is output to a user interface for display to a user. In one embodiment, the angular value is an articulation angle between the first and second portions of the articulated vehicle. In another embodiment, the angular value is a roll angle that describes an amount of roll experienced by the second portion of the articulated vehicle during articulation. In another embodiment, the angular value is a pitch angle that describes an amount of pitch experienced by the second portion of the articulated vehicle during articulation.

Figure 6:
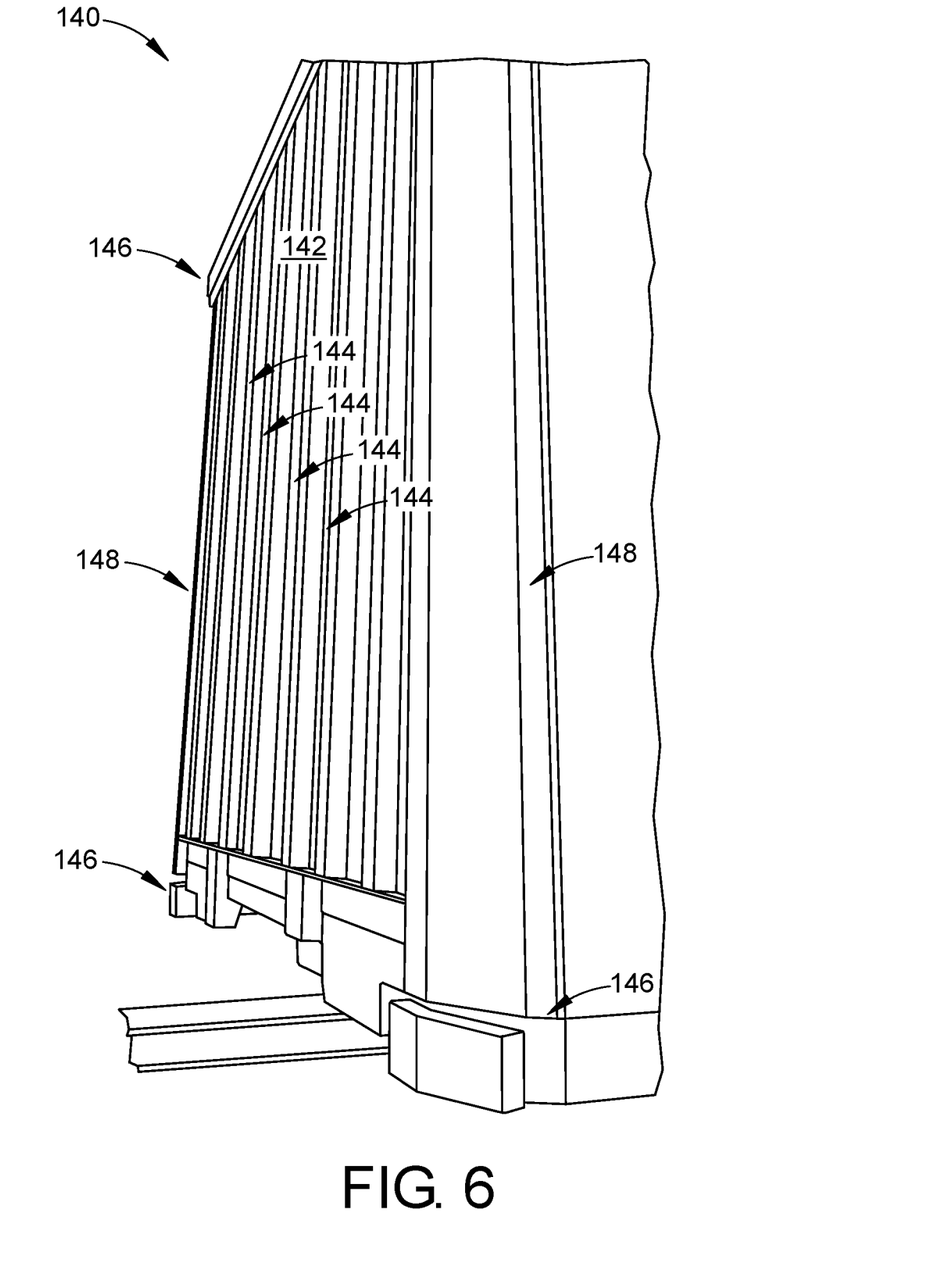
FIG. 6 illustrates a front face of a trailer with vertical reinforcement ribs.

With continued reference to the preceding Figures, and in accordance with another embodiment, FIG. 6 illustrates a front face 140 of a trailer 142 with vertical reinforcement ribs 144. When developing a geometric model (FIG. 1), in this example, the trailer front face is approximately 1.2 meters ahead of the kingpin, and is approximately 2.4 meters wide. This means that the angle from the kingpin, around which a tractor-trailer combination articulates, is +/−45 degrees to the outer trailer front corners 146. The distance between the outer trailer edges 148, as seen by the camera, is proportional to:

$$\sin(45+\text{art. angle})-\sin(\text{art. angle}-45). \quad (1)$$

Figure 7:
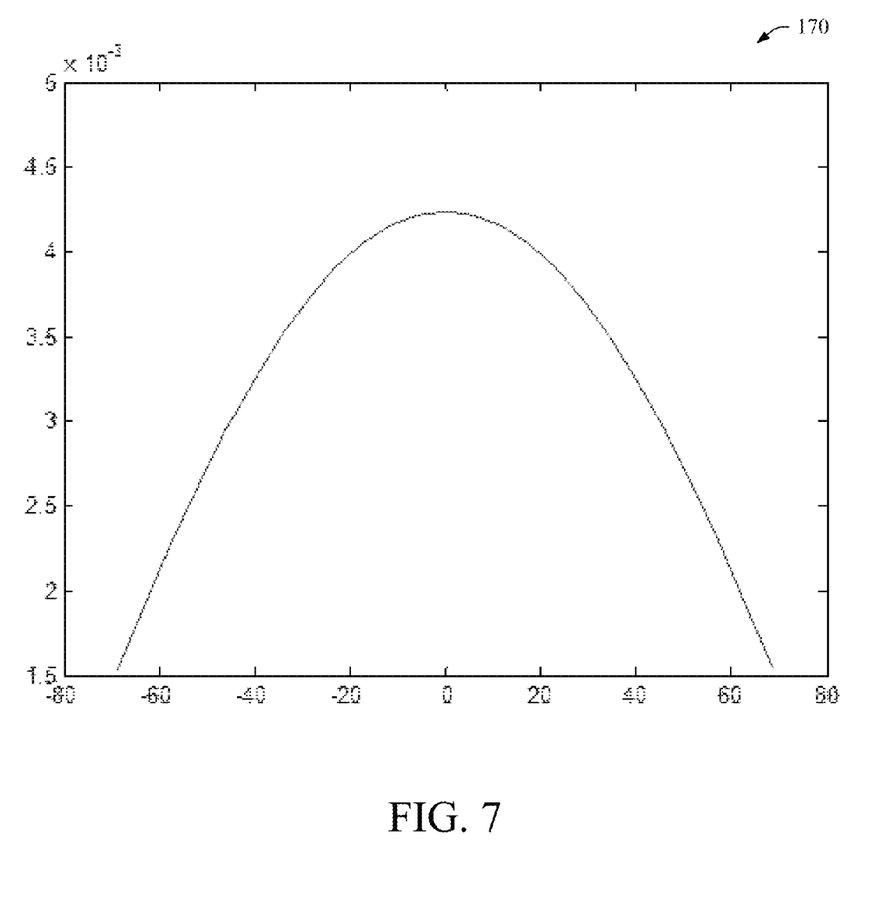
FIG. 7 illustrates a plot of the physical distance on the imager between the outer edges of the trailer using Equation (1) and a focal length of 2 mm, where the abscissa is the articulation angle in degrees, and the ordinate shows the physical distance (in meters) as it appears on the imager (user interface) between the outer edges of the trailer.

FIG. 7 illustrates a plot 170 of the physical distance on the imager between the outer edges of the trailer using Equation (1) and a focal length of 2 mm, where the abscissa is the articulation angle in degrees, and the ordinate shows the physical horizontal distance (in millimeters) as it appears on the imager (user interface) between the outer edges of the trailer. It may be seen that the trailer appears narrower as articulation angle increases, and appears widest with a zero articulation angle. The articulation angle is read from the current width as captured by the camera relative to the maximum captured by the camera, using the plot of FIG. 7.

Figure 8:
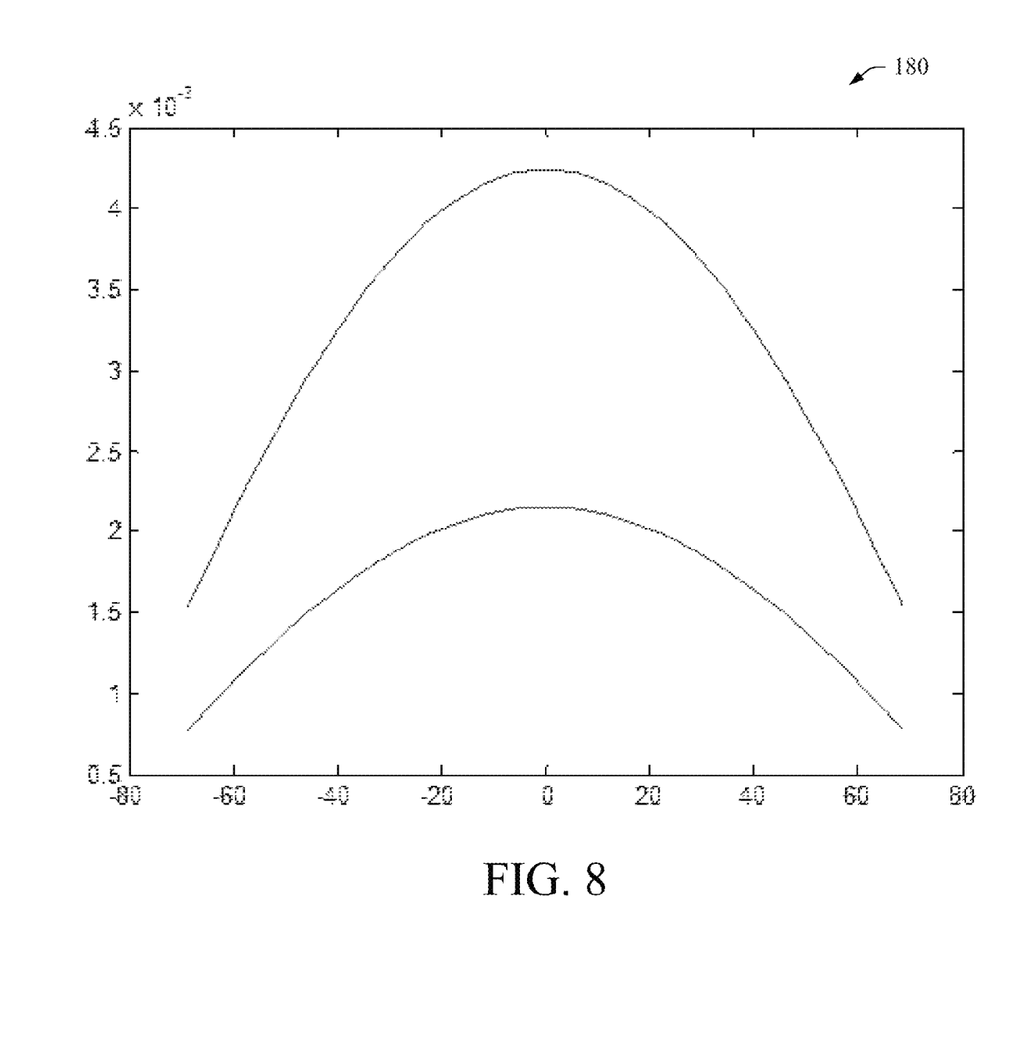
FIG. 8 illustrates a plot showing the width behavior between the inner ribs, e.g., at +/−0.6 meters out, using Equation 1 and a 2 mm focal distance where the abscissa is the articulation angle in degrees, and the ordinate shows the physical distance (in millimeters) as it appears on the imager (user interface) between the outer edges of the trailer.

FIG. 8 illustrates a plot 180 showing the behavior between the inner ribs, e.g., at +/−0.6 meters out, using Equation 1 and a 2 mm focal distance where the abscissa is the articulation angle in degrees, and the ordinate shows the physical distance (in millimeters) as it appears on the imager (user interface) between the outer edges of the trailer. The blue line is the plot of the distance between the trailer outer edges as seen by the camera and as shown in FIG. 7. The red line shows the width seen on the imager of the distance between two ribs, each 60 cm out from the central trailer axis.

Figure 9:
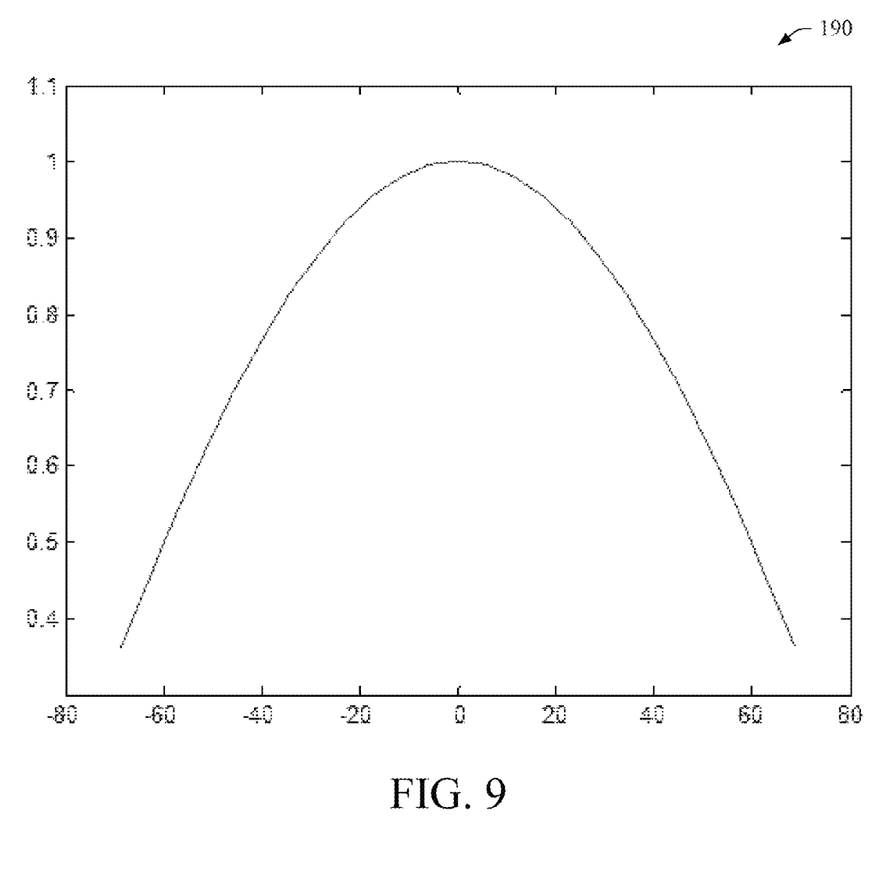
FIG. 9 shows a plot of the curve for the two ribs, normalized by the maximum width value observed by the camera.

FIG. 9 shows a plot 190 of the curve for the two ribs, normalized by the maximum value observed by the camera. As can be seen the normalized curve for the two ribs corresponds to the curve for the trailer edges (FIG. 7). This means given the current relative width as a percentage of the maximum seen for some pair of symmetrically located ribs or edges, the plot of FIG. 7 can be used to directly read the articulation angle of the trailer, independent of the ribs chosen. That is, given a measurement from the image, the current articulation angle can be determined e.g., via a lookup table or the like.

In one embodiment, the outer trailer edges are used to determine articulation angle due to the increased contrast between the edges of the trailer and the background scene, and because the effects of pixilation are smallest there (i.e., there is a relatively large number of pixels between the edges).

The formula for the distance between two symmetrically located vertical ribs on the trailer as seen by a camera can be described by:

$$\text{Constant}*(\sin(a+b)-\sin(b-a)) \quad (2)$$

Given the ratio of the width seen in the image to the maximum seen by the camera, the articulation angle can be read directly from the ratio of the current and maximum observed widths (e.g., passing by the plotted curve, performing a table lookup, etc.). The ratio is thus described as:

$$\text{Ratio}=\text{cosine of articulation angle} \quad (3)$$

Manipulating the above trigonometric expression, using the formulas for the sine of the sum and difference of angles, it can be shown that the above equations are true regardless of which pair of ribs is taken.

In another embodiment, the horizontal length of a line is considered, such as the horizontal bottom trailer edge (or top edge), and the ratio of the length of the line to the maximum observed is determined, which is equivalent to the above in that a line is drawn between two ribs or edges. In this example, the ratio is described as:

$$\text{Ratio of current line length/max line length}=\text{cosine of articulation angle} \quad (4)$$

The relation between the angle of such a horizontal line in the image and the articulation angle can be determined, for example, for a camera mounted on the back of a tractor, and viewing the trailer front. As the trailer articulates, the angle of a horizontal edge thereof changes as seen in the camera image. This horizontal edge may be, for example, the lower edge of the trailer. When the trailer is straight behind the tractor, then a center-mounted tractor camera sees the lower edge as horizontal in the image. As the trailer articulates, one edge comes closer to the camera, and the other recedes away, which affects the projected camera image.

For example, the location Q can be identified in the image, over the optical axis, to which one end of the lower trailer edge projects. The camera is mounted to look horizontally back at a height H over the trailer lower edge, has a focal length of FL, and is a distance A forward of the trailer lower edge (with no articulation). The trailer has a width, and has a kingpin mount behind the lower front edge. That is, the trailer corners (ends of the lower edge) form an angle ρ to the kingpin. The image row Q over the optical axis, in which each trailer lower edge end is located can be written as:

$$Q=(H*FL)/(A+H*\cos(\rho+/-\text{art. angle})) \quad (5)$$

where the +/− refers to the two ends (one comes closer, one recedes).

Figure 10:
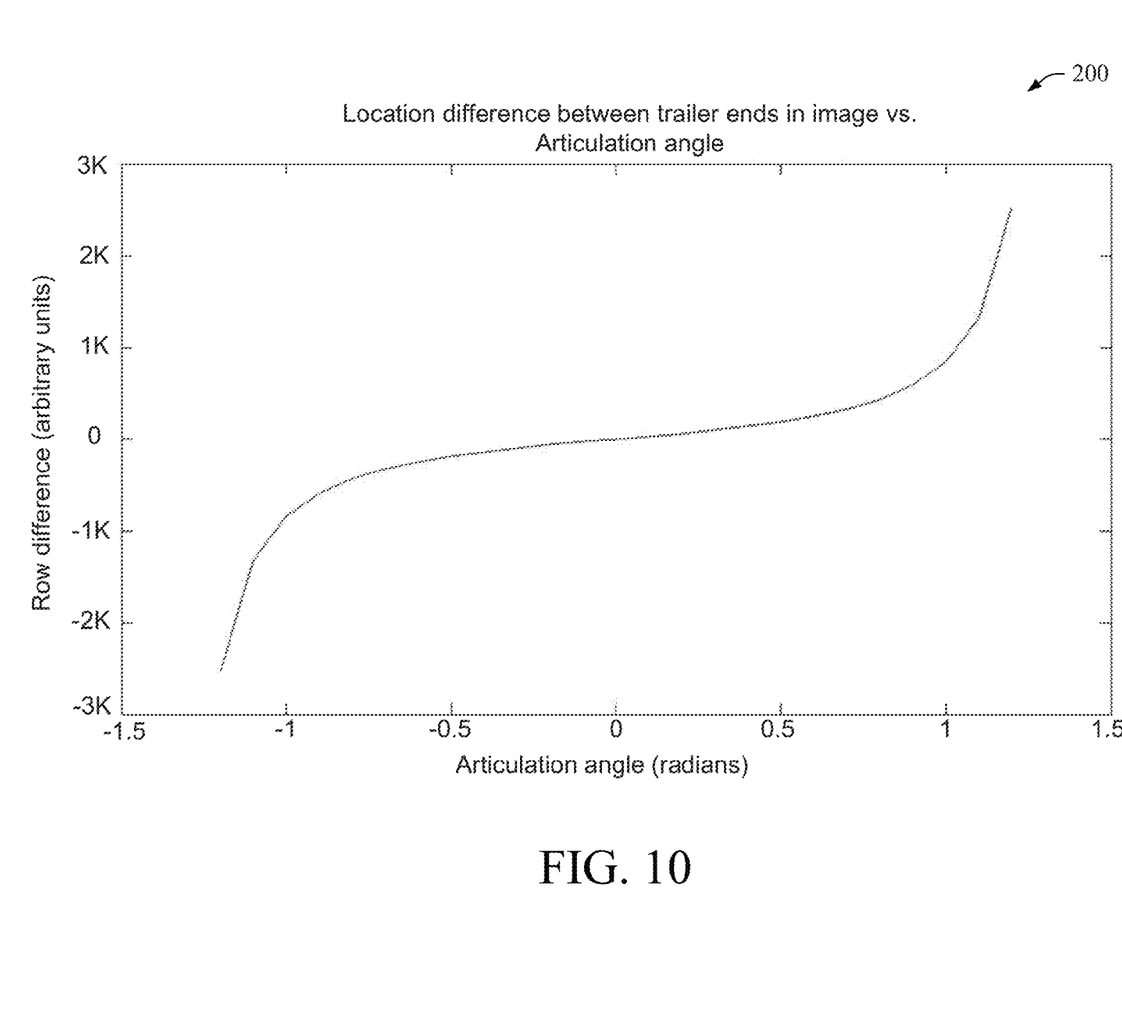
FIG. 10 shows a plot of the difference in Q for examples of real world values.

FIG. 10 shows a plot 200 of the difference in Q for two ends of a trailer lower edge for some real world values. For instance, a focal length FL of 2 mm, a height H of 2 meters, a distance A of 1 meter, and an angle ρ of 45° are assumed in this example, such that:

$$Q=(2e-3)/(1+2*\cos(45+/-\text{art angle}))$$

In this example, at 0° articulation angle, there is no location (row) difference between the ends of the trailer edge in the image (i.e., the curve goes through 0,0), and zero articulation gives a zero slope line in the image. As the vehicle is articulated, the trailer front lower edge in the image starts sloping one way, and is no longer horizontal. As the vehicle articulates in the other direction, the trailer front lower edge in the image starts sloping the other way and is no longer horizontal. With sufficient camera resolution, image data can be linearized and is then linearly related to articulation angle for small values thereof.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system that facilitates articulated vehicle articulation angle measurement, comprising:
   at least one camera coupled to a first portion of the articulated vehicle, wherein the camera monitors a second portion of the articulated vehicle, the second portion being articulably coupled to the first portion;

a processor configured to measure at least one parameter of the second portion of the articulated vehicle in an image captured by the at least one camera;

wherein the processor is further configured to execute a geometric model that converts the at least one parameter measurement into a corresponding angular value β between the first and second portions of the articulated vehicle:

wherein the at least one parameter is an angle α by which the second portion of the articulated vehicle appears to be offset from horizontal in the image.

2. The system according to claim 1, wherein the at least one parameter further comprises a position of the second portion of the articulated vehicle in the image.

3. The system according to claim 1, wherein the processor is further configured to calibrate the angular value by executing a bias-removing averaging function over a plurality of images of the second portion of the articulated vehicle.

4. The system according to claim 1, wherein the angular value is an articulation angle between the first and second portions of the articulated vehicle.

5. The system according to claim 1, wherein the angular value is a roll angle that describes an amount of roll experienced by the second portion of the articulated vehicle during articulation.

6. The system according to claim 1, further comprising:
a plurality of sensors coupled to the first and second portions of the articulated vehicle and in communication with each other;
wherein the processor is configured to:
execute a long term averaging function that calculates a static pitch angle measurement difference between at least one sensor on each of the first and second portions of the articulated vehicle; and
dynamically measure pitch angle between the first and second portions of the articulated vehicle.

7. The system according to claim 6, wherein the sensors are accelerometers.

8. The system according to claim 1, further comprising:
a plurality of sensors coupled to the first and second portions of the articulated vehicle and in communication with each other;
wherein the processor is configured to:
execute a long term averaging function that calculates a static roll angle measurement difference between at least one sensor on each of the first and second portions of the articulated vehicle; and
dynamically measure roll angle between the first and second portions of the articulated vehicle.

9. The system according to claim 8, wherein the sensors are accelerometers.

10. A method of determining an articulation angle between a first portion and a second portion of an articulated vehicle, comprising:
receiving at least one image from a camera coupled to the first portion of the articulated vehicle, wherein the camera monitors the second portion of the articulated vehicle, the second portion being articulably coupled to the first portion;
measuring at least one parameter of the second portion of the articulated vehicle in the at least one image;
inputting the at least one parameter into a geometric model thereby converting the at least one parameter measurement into a corresponding angular value β between the first and second portions of the articulated vehicle; and
outputting the articulation angle to a user interface for display to a user or to other vehicle subsystems;
wherein the at least one parameter is an angle α by which the second portion of the articulated vehicle appears to be offset from horizontal in the at least one image.

11. The method according to claim 10, wherein the at least one parameter further comprises a position of the second portion of the articulated vehicle in the image.

12. The method according to claim 10, further comprising calibrating the angle by executing a bias-removing averaging function over a plurality of images of the second portion of the articulated vehicle.

13. The method according to claim 10, wherein the angular value is an articulation angle between the first and second portions of the articulated vehicle.

14. The method according to claim 10, wherein the angular value is a roll angle that describes an amount of roll experienced by the second portion of the articulated vehicle during articulation.

15. The method according to claim 10, further comprising:
executing a long term averaging function that calculates a static pitch angle measurement difference between at least one sensor on each of the first and second portions of the articulated vehicle; and
dynamically measuring pitch angle between the first and second portions of the articulated vehicle.

16. The method according to claim 10, further comprising:
executing a long term averaging function that calculates a static roll angle measurement difference between at least one sensor on each of the first and second portions of the articulated vehicle; and
dynamically measuring roll angle between the first and second portions of the articulated vehicle.

17. A non-transitory computer-readable medium having stored thereon instructions for determining an articulation angle between a first portion and a second portion of an articulated vehicle, the instructions comprising:
receiving at least one image from a camera coupled to the first portion of the articulated vehicle, wherein the camera monitors the second portion of the articulated vehicle, the second portion being articulably coupled to the first portion;
measuring at least one parameter of the second portion of the articulated vehicle in the at least one image;
inputting the at least one parameter into a geometric model thereby converting the at least one parameter measurement into a corresponding angular value β between the first and second portions of the articulated vehicle; and
outputting the articulation angle to a user interface for display to a user or to other vehicle subsystems;
wherein the at least one parameter is an angle α by which the second portion of the articulated vehicle appears to be offset from horizontal in the at least one image.

18. A processor configured to execute computer-executable instructions for measuring, the instructions comprising:
receiving at least one image from a camera couple to the first portion of the articulated vehicle, wherein the camera monitors the second portion of the articulated vehicle, the second portion being articulably coupled to the first portion;
measuring at least one parameter of the second portion of the articulated vehicle in the at least one image;
inputting the at least one parameter into a geometric model thereby converting the at least one parameter measurement into a corresponding angular value β between the first and second portions of the articulated vehicle;

wherein the at least one parameter is an angle α by which the second portion of the articulated vehicle appears to be offset from horizontal in the at least one image.

19. The processor according to claim 18, wherein the at least one parameter further comprises a position of the second portion of the articulated vehicle in the image.

20. The processor according to claim 18, wherein the instructions further comprise calibrating the angle by executing a bias-removing averaging function over a plurality of images of the second portion of the articulated vehicle.

21. The processor according to claim 18, wherein the angular value is an articulation angle between the first and second portions of the articulated vehicle.

22. The processor according to claim 18, wherein the angular value is a roll angle that describes an amount of roll experienced by the second portion of the articulated vehicle during articulation.

23. The processor according to claim 18, wherein the instructions further comprise:

executing a long term averaging function that calculates a static pitch angle measurement difference between at least one sensor on each of the first and second portions of the articulated vehicle; and dynamically measuring pitch angle between the first and second portions of the articulated vehicle.

24. The processor according to claim 18, wherein the instructions further comprise:

executing a long term averaging function that calculates a static roll angle measurement difference between at least one sensor on each of the first and second portions of the articulated vehicle; and dynamically measuring roll angle between the first and second portions of the articulated vehicle.

25. An apparatus that facilitates articulated vehicle articulation angle measurement, comprising:

means for capturing images, coupled to a first portion of the articulated vehicle, wherein the means for capturing images monitors a second portion of the articulated vehicle, the second portion being articulably coupled to the first portion;

means for measuring an offset angle α of the second portion of the articulated vehicle in an image captured by the means for capturing images; and means for converting the measured offset angle into an articulation angle β between the first and second portions of the articulated vehicle;

wherein the offset angle α is an angle by which the second portion of the articulated vehicle appears to be offset from horizontal in the image.

* * * * *